(12) United States Patent
Dugas et al.

(10) Patent No.: US 12,102,033 B2
(45) Date of Patent: Oct. 1, 2024

(54) CUT QUALITY DETECTION AND REPORTING SYSTEM FOR A HARVESTER

(71) Applicant: DEERE & COMPANY, Moline, IL (US)

(72) Inventors: Bryan E. Dugas, Napoleonville, LA (US); John A. Dighton, Thibodaux, LA (US); Peter A. Johnson, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 947 days.

(21) Appl. No.: 17/097,897

(22) Filed: Nov. 13, 2020

(65) Prior Publication Data

US 2022/0151139 A1    May 19, 2022

(51) Int. Cl.
| | |
|---|---|
| A01D 34/00 | (2006.01) |
| A01D 45/10 | (2006.01) |
| G01B 11/25 | (2006.01) |
| G01S 17/89 | (2020.01) |
| G06F 18/24 | (2023.01) |
| G06T 7/00 | (2017.01) |

(52) U.S. Cl.
CPC .......... *A01D 34/006* (2013.01); *A01D 45/10* (2013.01); *G06F 18/24* (2023.01); *G06T 7/0004* (2013.01); *G01B 11/25* (2013.01); *G01S 17/89* (2013.01); *G06T 2207/30164* (2013.01)

(58) Field of Classification Search
CPC ...... A01D 34/006; A01D 45/10; G06F 18/24; G06T 7/0004
See application file for complete search history.

(56) References Cited

U.S. PATENT DOCUMENTS

| 5,311,600 A | 5/1994 | Aghajan et al. |
| 6,119,442 A | 9/2000 | Hale |
| 6,931,828 B2 | 8/2005 | Kormann |

(Continued)

FOREIGN PATENT DOCUMENTS

EP    2225931 A1    9/2010

OTHER PUBLICATIONS

Alencastre-Miranda M, Johnson RM, Krebs HI. Convolutional neural networks and transfer learning for quality inspection of different sugarcane varieties. IEEE Transactions on Industrial Informatics. May 4, 2020;17(2):787-94. (Year: 2020).*

(Continued)

*Primary Examiner* — David Perlman
(74) *Attorney, Agent, or Firm* — Michael Best & Friedrich LLP

(57) ABSTRACT

A harvester including an inlet configured to receive a crop including a stalk, a blade configured to cut the crop into a billet, a sensor configured to detect a three-dimensional appearance of at least a portion of the billet and generate a signal associated with the three-dimensional appearance of the at least a portion of the billet, and a control system having a processor, a memory, and a human-machine interface. The control system is configured to receive the signal from the sensor and programmed to 1) analyze the three-dimensional appearance of the at least a portion of the billet, 2) classify the three-dimensional appearance using an indicator of cut quality and 3) index the indicator of cut quality into the memory.

19 Claims, 6 Drawing Sheets

(56) References Cited

U.S. PATENT DOCUMENTS

| | | |
|---|---|---|
| 6,960,056 B2 | 11/2005 | Hinds |
| 2005/0072135 A1 | 4/2005 | Kormann |
| 2006/0191251 A1 | 8/2006 | Pirro et al. |
| 2009/0297040 A1 | 12/2009 | Missotten et al. |
| 2012/0020531 A1 | 1/2012 | Owens, Jr. |
| 2012/0123650 A1* | 5/2012 | Diekhans ............ A01D 43/085 701/50 |
| 2015/0342118 A1 | 12/2015 | Corbett et al. |

OTHER PUBLICATIONS

Xie, Luxin, Jun Wang, Shaoming Cheng, Bosheng Zeng, and Zizeng Yang. "Performance evaluation of a chopper system for sugarcane harvester." Sugar Tech 21 (2019): 825-837. (Year: 2019).*

Moises Alencastre-Miranda et al., Robotics for Sugarcane Cultivation: Analysis of Billet Quality using Computer Vision, IEEE Robotics and Automation Letters, May 2018, pp. 1-8, Retrieved from the Internet <URL: https://www.researchgate.net/publication/326485482_Robotics_for_Sugarcane_Cultivation_Analysis_of_Billet_Quality_using_Computer_Vision>.

* cited by examiner

CUT QUALITY DETECTION AND REPORTING SYSTEM FOR A HARVESTER

BACKGROUND

The present disclosure relates to a harvester having a chopper for cutting a crop, such as sugar cane.

The chopper includes a blade or blades that wear over time as a result of use. The blade or blades must be periodically replaced.

SUMMARY

The disclosure provides a chopper cut quality system that detects and reports the cut quality indicating a maintenance need (e.g., blade wear and/or a need to change the blade) and/or an impact on ability to efficiently clean the crop.

In one aspect, the disclosure provides a harvester including an inlet configured to receive a crop including a stalk, a blade configured to cut the crop into a billet, a sensor configured to detect a three-dimensional appearance of at least a portion of the billet and generate a signal associated with the three-dimensional appearance of the at least a portion of the billet, and a control system having a processor, a memory, and a human-machine interface. The control system is configured to receive the signal from the sensor and programmed to 1) analyze the three-dimensional appearance of the at least a portion of the billet, 2) classify the three-dimensional appearance using an indicator of cut quality and 3) index the indicator of cut quality into the memory.

In another aspect the disclosure provides a harvester including an inlet configured to receive a crop including a stalk, a blade configured to cut the crop into a billet and thereby form a cut area of the billet, a sensor configured to detect an appearance of the cut area of the billet and generate a signal corresponding to the appearance of the cut area of the billet, and a control system including a processor, a memory, and a human-machine interface. The control system is configured to receive the signal from the sensor and programmed to 1) analyze the appearance of the cut area of the billet and 2) communicate a message, by way of the human-machine interface, informative of blade wear and/or cut quality inferred from the appearance of the cut area of the billet.

In yet another aspect, the disclosure provides a harvester including an inlet configured to receive a crop including a stalk, a blade configured to cut the crop into a billet, a sensor configured to detect an appearance of at least a portion of the billet and generate a signal corresponding to the appearance of the at least a portion of the billet, and a control system including a processor, a memory, and a human-machine interface. The control system is configured to receive the signal from the sensor and programmed to 1) classify a cut quality of the billet based on the signal, wherein classifying the cut quality includes assigning a cut quality indicator from a range of cut quality indicators to the billet, wherein the range of cut quality indicators includes at least one indicator of relatively high cut quality and at least one indicator of relatively low cut quality, and 2) index the cut quality indicator into the memory.

Other aspects of the disclosure will become apparent by consideration of the detailed description and accompanying drawings.

DETAILED DESCRIPTION

Before any implementations of the disclosure are explained in detail, it is to be understood that the disclosure is not limited in its application to the details of construction and the arrangement of components set forth in the following description or illustrated in the accompanying drawings. The disclosure is capable of supporting other implementations and of being practiced or of being carried out in various ways.

Figure 1:
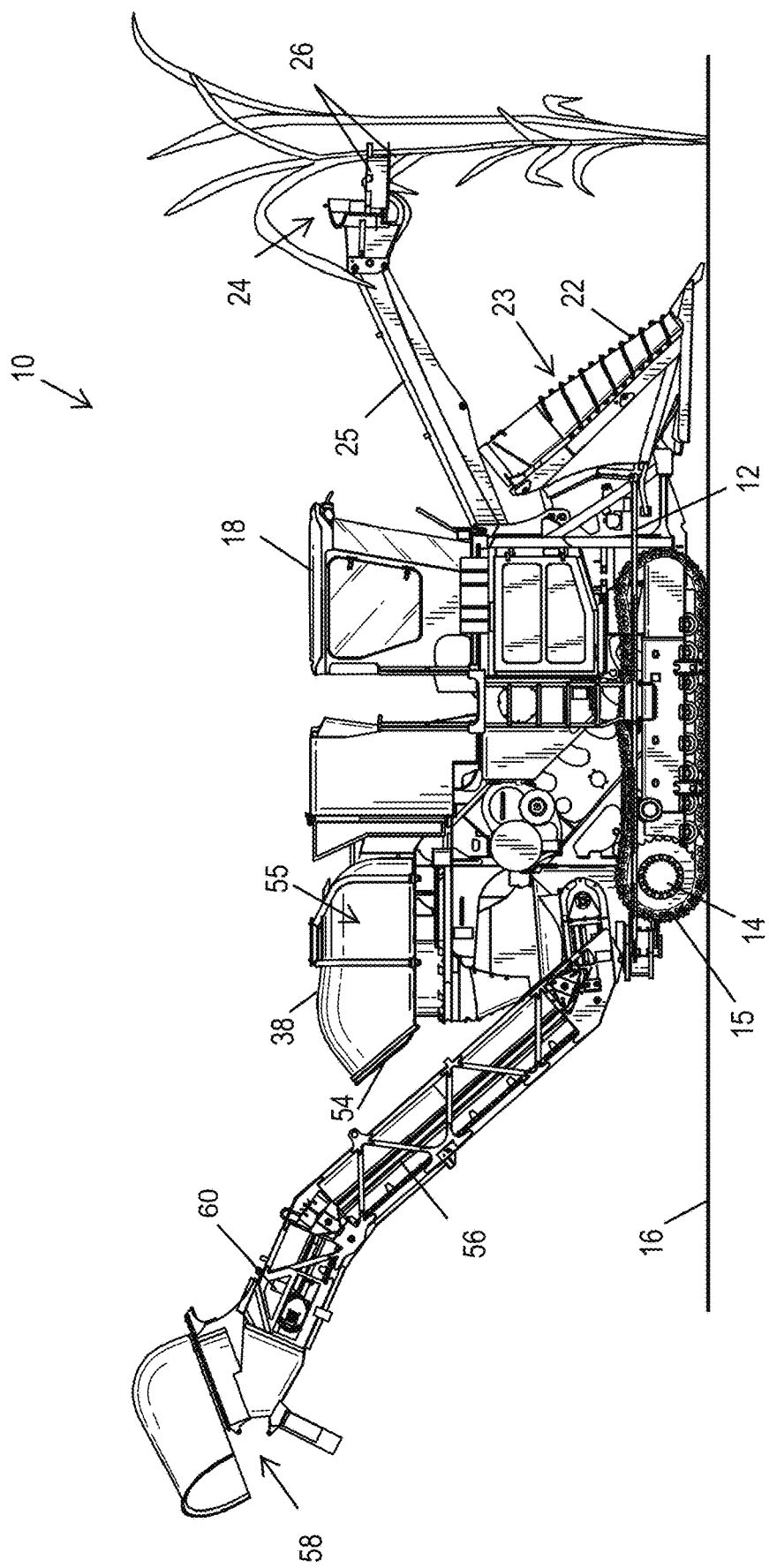
FIG. 1 is a side view of a harvester, such as a sugar cane harvester, in accordance with one implementation of the present disclosure.

FIG. 1 illustrates a harvester 10, such as a sugarcane chopper harvester, including a prime mover (not shown), such as an internal combustion engine, for providing motive power and a throttle 11 (FIG. 3) for controlling a speed of the prime mover and thus a ground speed of the harvester 10. The harvester includes a main frame 12 supported on wheels 14 having continuous tracks 15, tires, or other traction devices that engage a support surface 16 (e.g., the ground or field). The tracks 15 interact directly with the support surface 16 and are responsible for harvester 10 movement and tractive effort, although in other implementations the harvester 10 is provided only with wheels (rather than tracks as illustrated). An operator's cab 18 is mounted on the frame 12 and contains a seat 20 (FIG. 3) for an operator. A pair of crop lifters 22 having side by side augers or scrolls is mounted to the front of the frame 12, which operate on opposite sides of a row of crop to be harvested. The pair of crop lifters 22 generally define an inlet 23 for receiving the crop. The crop lifters 22 cooperate with a base cutter (not shown) including counter-rotating discs which cut off the stalks of crop close to the support surface 16. A topper 24 extends from the frame 12 on a boom 25. The topper 24 has a topper blade or blades 26 for cutting the tops off crop. In other implementations, the harvester 10 may be configured for other crops, such as corn and other plants.

Figure 2:
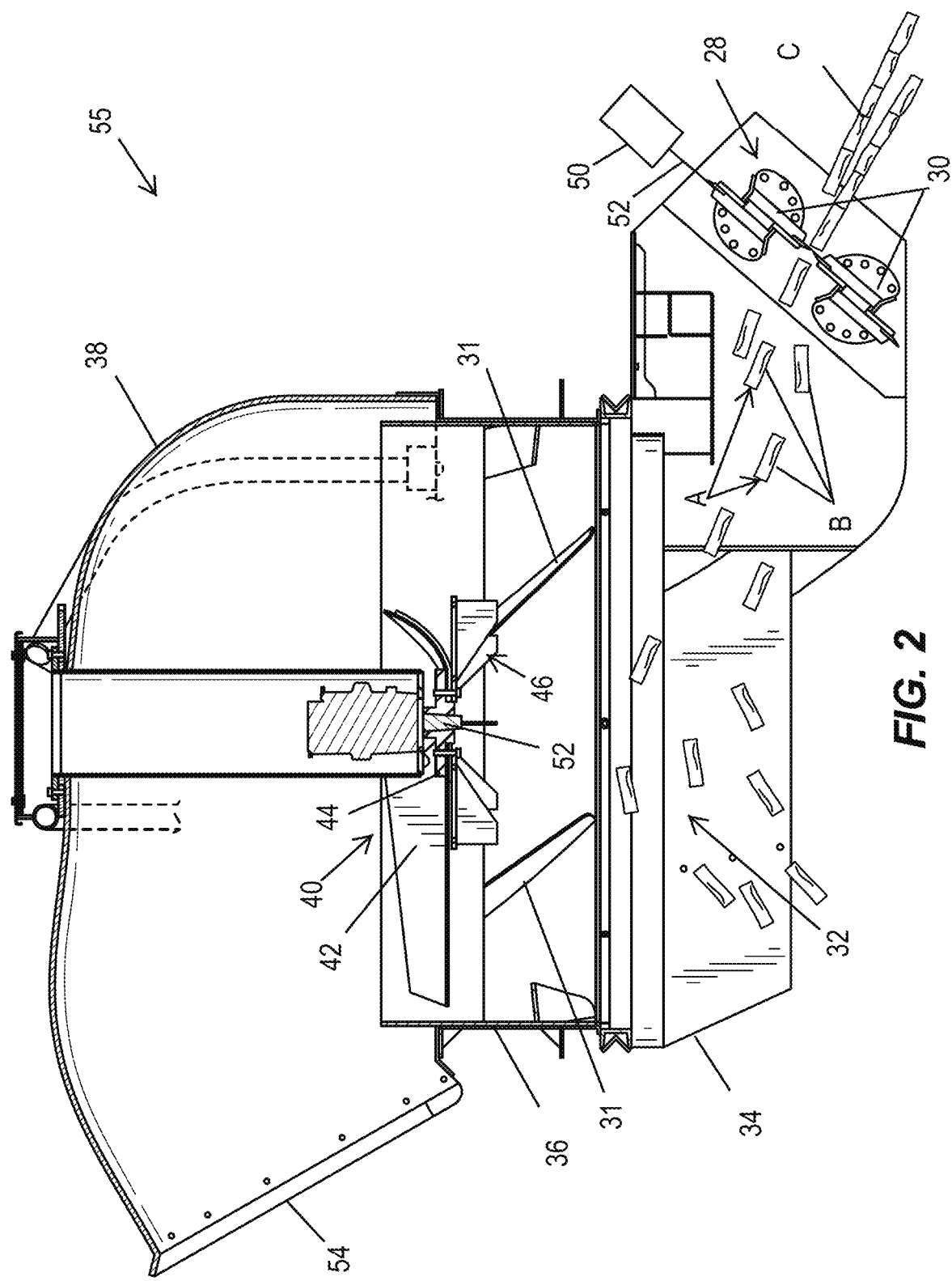
FIG. 2 is an enlarged cross-sectional view of a portion of the harvester of FIG. 1.

FIG. 2 illustrates a cross section through a chopper 28 and a separator 55. The chopper 28 cuts the crop and the separator 55 receives the cut crop from the chopper 28 and generally separates the cut crop by way of a crop cleaner 40. A motor 50 drives the chopper 28, such as a hydraulic motor, a pneumatic motor, an electric motor, an engine, or other suitable prime mover. The crop cleaner 40 may include any suitable mechanism for cleaning the cut crop, such as a fan (as in the illustrated implementation), a source of compressed air, a rake, a shaker, or any other mechanism that discriminates various types of crop parts by weight, size, shape, etc. in order to separate extraneous plant matter from billets. The separator 55 may include any combination of one or more of a cleaning chamber 32, a cleaning chamber housing 34, the crop cleaner 40, a fan enclosure 36, a hood 38 having an opening 54, and a centrifugal blower wheel 46.

The separator 55 is coupled to the frame 12 and disposed downstream of the crop lifters 22 for receiving cut crop from the chopper 28. The chopper 28 includes a blade 30 for cutting the stalks of crop stalks of crop, such as cane C, into billets B, which are pieces of the stalk. In the illustrated implementation, the blade 30 may include counter-rotating drum cutters with overlapping blades. In other implementations, the chopper 28 may include any suitable blade or blades for cutting the stalks of crop. The crop also includes dirt, leaves, roots, and other plant matter, which will be collectively referred to herein as extraneous plant matter, which are also cut in the chopper 28 along with the cane C. The chopper 28 directs a stream of the cut crop (billets B, and cut extraneous plant matter) to the cleaning chamber 32, which is generally defined by the cleaning chamber housing 34, the fan enclosure 36, and/or the hood 38, all of which are coupled to the frame 12 and located just downstream of the chopper 28 for receiving cut crop from the chopper 28. The fan enclosure 36 is coupled to the cleaning chamber housing 34 and may include deflector vanes 31.

The hood 38 is coupled to the fan enclosure 36 and has a domed shape, or other suitable shape, and includes an opening 54 angled out from the harvester 10 and facing slightly down onto the field 16. In some implementations, the opening 54 may be generally perpendicular to the drive shaft 52. The hood 38 directs cut crop through the opening 54 to the outside of the harvester 10, e.g., for discharging a portion of cut crop removed from the stream of cut crop back onto the field.

The motor 50, such as a hydraulic motor, includes a drive shaft 52 operatively coupled to drive the chopper 28. For example, the drive shaft 52 may be keyed or operatively coupled in other suitable ways to drive the chopper 28.

Referring again to FIG. 1, a conveyor 56 is coupled to the frame 12 for receiving cleaned crop from the separator 55. The conveyor 56 terminates at a discharge opening 58 (or outlet) elevated to a height suitable for discharging cleaned crop into a collection receptacle of a vehicle (not shown), such as a truck, wagon, or the like following alongside the harvester 10. A secondary cleaner 60 may be located adjacent the discharge opening 58 for cleaning the crop a second time before being discharged to the vehicle. For example, the secondary cleaner 60 may include a fan, compressed air, a rake, a shaker, or other suitable device for cleaning the crop.

The billets B are generally separated from the extraneous plant matter in the cleaning chamber 32 as the fan 40 draws the generally lighter extraneous plant matter into the hood 38 and out the opening 54. All the cut crop directed through the opening 54, which is ejected back onto the field, is referred to herein as residue. Residue typically includes primarily the extraneous plant matter (which has generally been cut) and may include some billets B.

The cleaning chamber housing 34 directs the cleaned crop to the conveyor 56. The cleaned crop typically includes primarily billets B, although some extraneous plant matter may still be present in the cleaned crop. Thus, some extraneous plant matter may be discharged with the billets B from the discharge opening 58. Extraneous plant matter discharged from the discharge opening 58 to the vehicle is referred to herein as trash.

Figure 3:
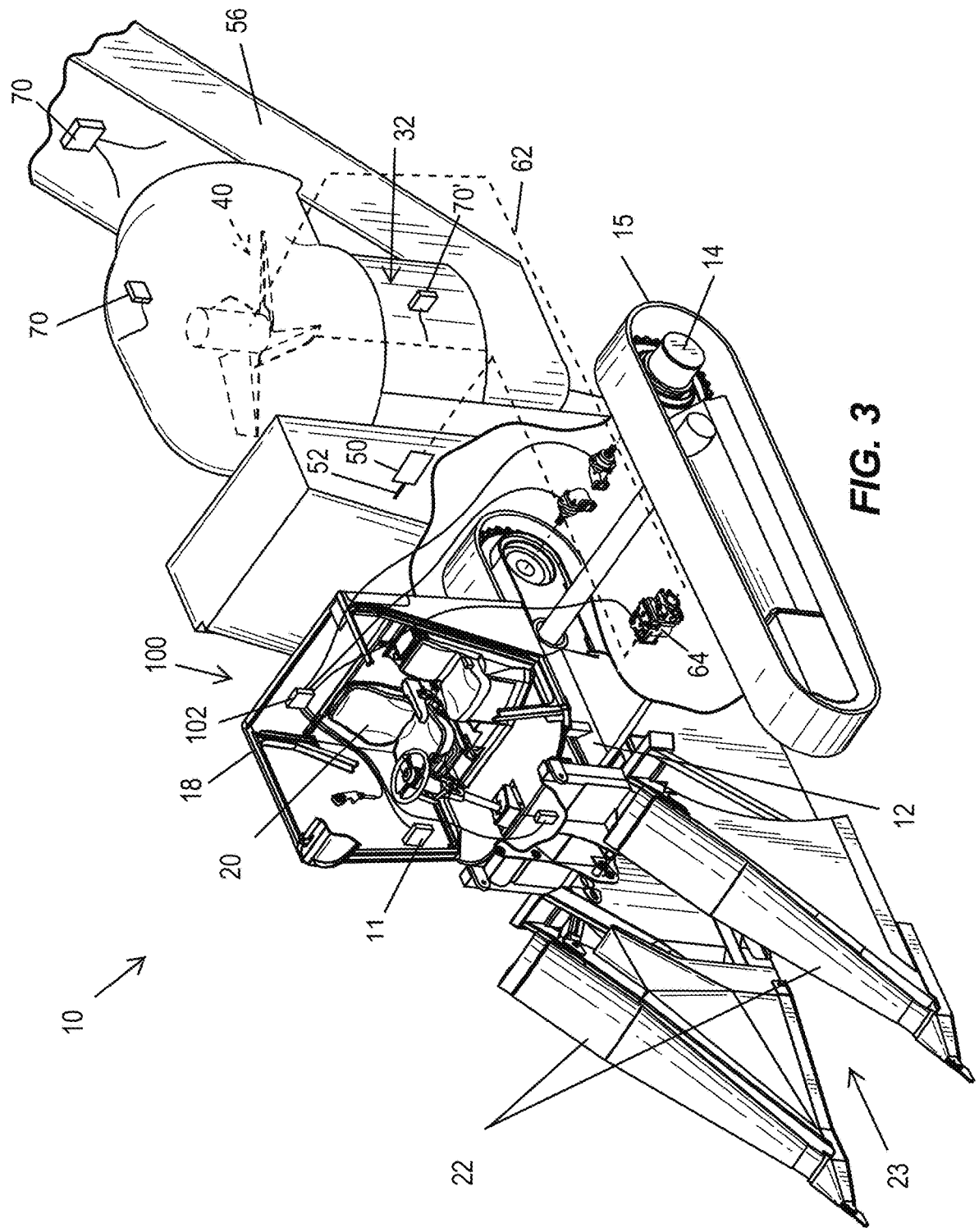
FIG. 3 is a perspective view of another portion of the harvester of FIG. 1.

Illustrated schematically in FIG. 3, a hydraulic circuit 62 for powering the motor 50 is operatively coupled thereto. In other implementations, the circuit 62 may be electric, pneumatic, may comprise mechanical linkages, etc. A detailed description of one example of a hydraulic circuit for a harvester fan can be found in U.S. Patent Publication No. 2015/0342118, jointly owned with the present application, the entire contents of which are incorporated herein by reference.

For example, the hydraulic circuit 62 is a closed-loop hydraulic circuit, which is powered by a pump 64. The pump 64 may be driven by the prime mover (not shown) of the harvester 10 or other power source.

The harvester 10 includes a sensor 70 configured to detect a three-dimensional appearance of a portion of a billet B passing through the harvester 10 and/or a whole billet B. The sensor 70 may be configured to detect any wavelength or frequency in the spectrum. For example, the sensor 70 may include a three-dimensional vision camera, a light detection and ranging (LIDAR) device, and/or a structured light three-dimensional scanner. The sensor 70 may detect every billet B or just some of the billets B.

The sensor 70 may be disposed downstream of the chopper 28 in any suitable location for observing the billets B. More specifically, the sensor 70 may be disposed adjacent the conveyor 56 (e.g., overhead of the conveyor 56) to observe the billets B being conveyed thereon, as illustrated in FIG. 3. The sensor 70 may additionally or alternatively be disposed in the cleaning chamber 32, as also illustrated in FIG. 3 using reference numeral 70'. The sensor 70 may also be disposed outside of the harvester 10, such as to observe the billets B collected in the collection vehicle (not shown) or even at a mill or other destination.

The sensor 70 is configured to generate a signal associated with the three-dimensional appearance of the at least a portion of the billet B. For example, the blade 30 cuts the stalks into billets B thereby forming a cut area A on each billet B. The cut area A may be defined as an end portion of the billet B that has been severed by the blade 30, which may include an end surface and/or some of the side surfaces. The sensor 70 may be configured to generate a signal associated with at least an appearance of the cut area A of the billet B and/or other areas of the billet B. In other implementations, the sensor 70 may include a two-dimensional vision sensor, such as a camera configured to detect any wavelength or frequency in the spectrum and generate a signal associated with at least a two-dimensional appearance of the cut area A of the billet B and/or other areas of the billet B.

Figure 4:
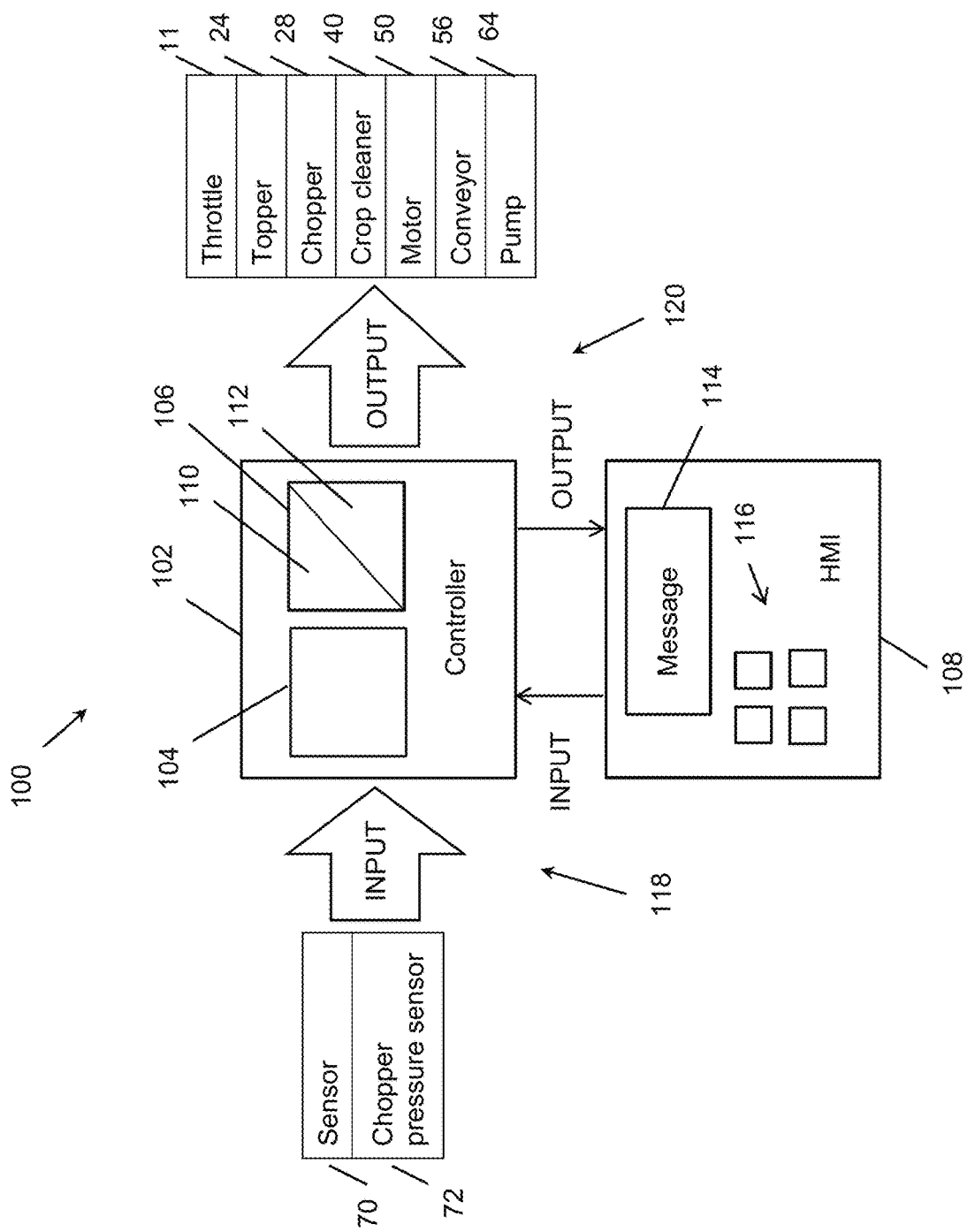
FIG. 4 is a schematic diagram illustrating a control system of the harvester of FIG. 1.

As illustrated in FIGS. 3-6, and particularly FIG. 4, a control system 100 includes a controller 102 having a programmable processor 104 (e.g., a microprocessor, a microcontroller, or another suitable programmable device), a memory 106, and a human-machine interface 108. The memory 106 may include, for example, a program storage area 110 and a data storage area 112. The program storage area 110 and the data storage area 112 can include one type or combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The control system may include programming, such as algorithms and/or neural networks. The control system 100 may also, or alternatively, include integrated circuits and/or analog devices, e.g., transistors, comparators, operational amplifiers, etc., to execute the logic, algorithms, and control signals described herein.

The human-machine interface 108 may include a display panel 114 and a control panel 116. The display panel 114 may convey visual and/or audio information to an operator, e.g., a message to the operator. The message (illustrated schematically in FIG. 4) may include an icon, an image, a symbol, a color, a gauge, text, audio, etc., or even controlling a change in one of the harvester 10 components, such as changing a speed or operation of the harvester 10 (e.g., by way of the throttle 11) or of any of the components described herein (e.g., stopping the harvester 10, increasing or decreasing the speed of the chopper 28, etc.). The message may have other forms, such as sending a signal to another device, which may be useful for notifying others having an interest in the cut quality/blade wear, such as another operator, a field manager, a mechanic, an owner, a mill operator, etc. For example, the display panel 114 may include a screen, a touch screen, one or more speakers, etc. The control panel 116 is configured to receive input from the operator. For example, the control panel 116 may include buttons, dials, a touch screen (which may be the same touch screen that provides the display panel or a different touch screen), or the like, with which an operator can input settings, preferences, commands, etc. to control the harvester 10.

The control system 100 includes a plurality of inputs 118 and outputs 120 to and from various components, as illustrated in FIGS. 3 and 4. The controller 102 is configured to provide control signals to the outputs 120 and to receive signals (e.g., sensor data signals, user input signals, etc.) from the inputs 118. Signals, as used herein, may include electronic signals (e.g., by circuit or wire), wireless signals (e.g., by satellite, internet, mobile telecommunications technology, a frequency, a wavelength, Bluetooth®), or the like. The inputs may include, but are not limited to, the control panel 116, or more generally the human machine interface 108, the sensor 70, and the chopper pressure sensor 72 (which will be described in greater detail below), and may include other components described herein as well as other components not described herein. The outputs may include, but are not limited to, the throttle 11, the topper 24, the chopper 28, the crop cleaner 40, the motor 50, the conveyor 56, and the pump 64, and may include other components described herein as well as other components not described herein.

High cut quality at the chopper 28 is important for improving cleaning at the crop cleaner 40 and for improving sugar recovery from the cut crop at the mill. Higher quality cuts mean better cleaning results and more sugar recovered (i.e., less juice lost due to bad cuts, crushing, etc.). The blade 30 is a high wear item and is replaced often (e.g., weekly) depending on tonnage of crop harvested and the incidence of metal or other non-crop items passing through the chopper 28. To effectively clean the crop for typical cleaning chambers it is important that the blade 30 remains sharp to not only cut the stalk into billets B but also to cut the attached extraneous plant matter. As the blade 30 wears, the ability to clean is diminished. "Wear" refers herein to dulling of the blade as a result of the amount of crop processed and/or damage to the blade (e.g., chips, scratches, warping, bending, breaking, cracking, gouges, nicks, deformation, deviating from a desired position, etc. from crop or other non-crop items passing through the chopper 28 and/or from other sources that diminish cut quality over time. Cut quality of the billets B corresponds inversely to blade wear, e.g., as blade wear increases, cut quality goes down. As such, it can be inferred from observing cut quality that as cut quality goes down, blade wear is increasing. A level of blade wear, blade sharpness, blade damage, etc. can be inferred from the cut quality observations and communicated to the operator by way of the human-machine interface 108 (e.g., as one of the forms of a message described above). The cut quality can also be communicated to the operator by way of the human-machine interface 108 in the form of a message. The disclosure relates to analyzing an appearance of the billets B (which may include a portion of the billets B such as the cut area A), classifying an indicator of cut quality associated with the billets B, indexing the classifications into the memory 106, and communicating a message, by way of the human-machine interface 108, informative of blade wear and/or cut quality.

The control system 100 receives the signal from the sensor 70 indicative of the appearance of the billet B. The control system 100 may continuously or periodically analyze the appearance of the billets B downstream of the chopper 28, e.g., to measure parameters of a cut. It should be understood that a different billet B is analyzed each time, though the process of analyzing each new billet B may be the same. As such, only the process of analyzing a single billet B need be described herein.

Specifically, the cut area A of the billet B may be analyzed. In other implementations, any other suitable portion of the billet B, or the whole billet B, may be analyzed. The cut area A is particularly indicative of cut quality of the chopper 28 because damage to the billet B caused by a worn blade 30 is visible in the cut area A. Thus, a level of damage to the billet B can be assessed from observing the cut area A.

For example, roundness, degree of crushing, number of cut surfaces, appearance of severed fibers, or a deviation from an optimal appearance are parameters in determining the level of damage. As a more specific example, severed fibers in the cut area A may have an increasingly jagged and/or loose appearance as the blade 30 wears. The control system 100 may measure lengths of the severed fibers based on the signal from the sensor 70 to assess the level of damage and therefore the cut quality. The lengths may be saved in the memory 106 but need not be saved in some implementations. Such an algorithm may be hard-coded or may employ a neural network trained with pre-classified images to recognize images having various lengths of severed fibers. For example, the neural network may include a convolutional neural network.

Figure 5:
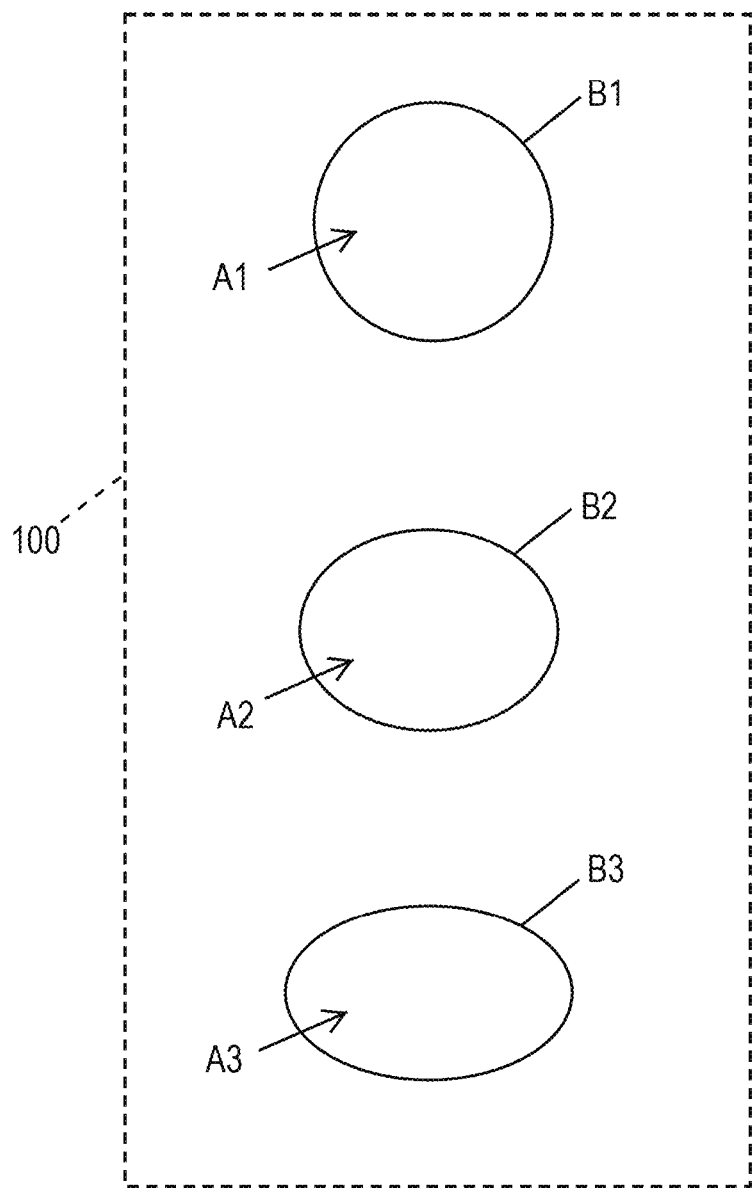
FIG. 5 is a schematic diagram illustrating images being analyzed in the control system of FIG. 4.

As another specific example, illustrated in FIG. 5, the degree of crushing may be assessed by measuring roundness of an end view, e.g., a cross-sectional view, of the cut area A. FIG. 5 illustrates a representation of the signals received by the control system 100 from the sensor 70, the signals including images of the cut area A of different billets B (labeled as cut areas A1-A3 and billets B1-B3 in FIG. 5). The cut areas A are increasing in eccentricity from A1 to A3. The control system 100 may be hard-coded to calculate the eccentricity of each cross-sectional view of the cut areas A1-A3, e.g., using observed measurements taken from the images or any other suitable method. It is known that the eccentricity of a circle is zero and ellipses have an eccentricity greater than zero and less than one. Increased crushing may result in increased eccentricity. Thus, the level of damage to the billet B is greater as the eccentricity increases. Therefore, the calculated eccentricity value may be used to assess the level of damage and therefore the cut quality. The eccentricities may be saved in the memory 106 but need not be saved in some implementations. In other implementations, the neural network may be trained with pre-classified images to recognize images having various degrees of crushing or any other parameter.

In some implementations, an eccentricity of zero (or another low eccentricity value) may be programmed as the optimal appearance (in this example, the optimal appearance being the optimal eccentricity). The deviation from the optimal appearance (e.g., a difference between the optimal eccentricity and the measured eccentricity) may be used to classify the level of damage and therefore the cut quality.

Other surfaces features may be employed as parameters for classifying cut quality. The control system 100 may use multiple billet B measurements to classify the cut quality. Advantageously, the three-dimensional data allow for multiple measurements to be taken from a single three-dimensional image.

The control system 100 classifies the appearance of the billet B by selecting from a range of cut quality indicators. Each cut quality indicator may include a unitless label, such as LOW, MEDIUM, and HIGH, or POOR, GOOD, and BEST, or other first, second, and third indicators indicative of increasing or decreasing cut quality relative to each other, or other equivalent indicators. For example, indicators labeled to be indicative of the measurement taken (as described above), such as eccentricity, fiber length, degree of damage, or any other parameter that correlates with cut quality and can therefore be used to classify cut quality, are considered equivalent. Any number of cut quality indicators may be employed. For example, two cut quality indicators may be employed, such as LOW and HIGH. In other examples, four or more cut quality indicators may be employed.

In this example, LOW represents a relatively low cut quality, such as a relatively large eccentricity (e.g., referenced to a pre-defined scale of eccentricities and/or compared to previously recorded eccentricities and/or as ascertained by the deviation from the optimal eccentricity, as discussed above, or the like). MEDIUM represents a relatively intermediate cut quality, such as a relatively intermediate eccentricity (e.g., referenced to the pre-defined scale of eccentricities and/or compared to previously recorded eccentricities and/or as ascertained by the deviation from the optimal eccentricity, as discussed above, or the like). HIGH represents a relatively high cut quality, such as a relatively small eccentricity (e.g., referenced to the pre-defined scale of eccentricities and/or compared to previously recorded eccentricities and/or as ascertained by the deviation from the optimal eccentricity, as discussed above, or the like).

In some implementations, the neural network classifies the appearance of the billet B using the cut quality indicators based on its training. For example, the neural network is trained using images pre-classified into LOW, MEDIUM, and HIGH (or the other indicators used, as described above).

Figure 6:
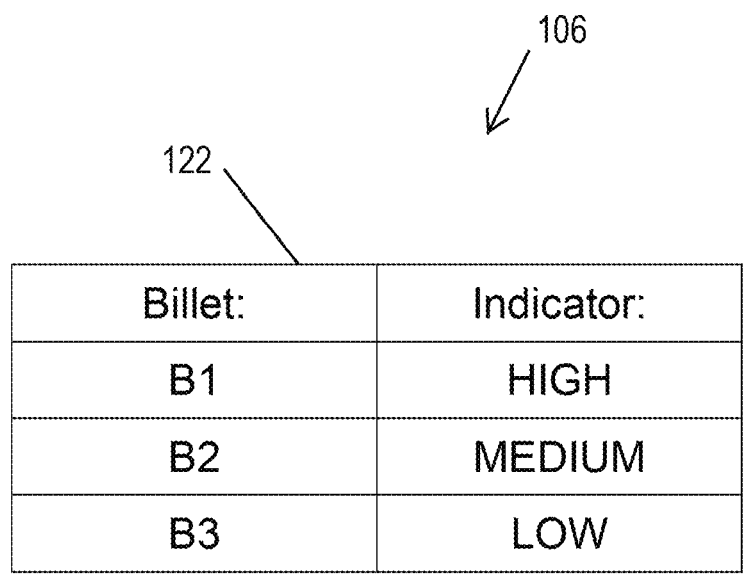
FIG. 6 is a table illustrating the images being classified and indexed in the control system of FIG. 4.

The control system 100 indexes the indicators into the memory 106, as shown in one example illustrated as a table 122 in FIG. 6. Using the images processed/analyzed in FIG. 5 including the cut areas A1-A3 of the billets B1-B3 (respectively), the indicators HIGH, MEDIUM, and LOW are classified and indexed into the table 122. The table is saved in the memory 106. Other methods for indexing the indicators may be employed.

As discussed above, the relationship between cut quality and blade wear may be used to infer blade wear from the indexed cut qualities. The control system 100 is configured to communicate a message (illustrated schematically in FIG. 4 and described above), by way of the human machine interface 108, informative of blade wear based on the indexed cut qualities. For example, the message may be triggered when the cut quality diminishes to a predetermined level, or to a predetermined level for a predetermined amount of time, or in other suitable ways.

The message informative of blade wear may include information regarding a level of blade wear, blade sharpness, blade damage, etc. as well as cut quality itself (from which the operator could infer the blade wear). For example, the message may include a gauge (such as a visual image of a gauge or an actual gauge) displaying the above information on a scale having a level indicator, as a numerical value, as a percentage, as an estimated proportion of life, as an estimated condition, as a maintenance recommendation (such as a recommendation to change the blade 30), etc.

Ultimately, the blade wear and/or cut quality information is inferred from the appearance of the billet B using the control system 100 as described above. Specifically, in some implementations, the blade wear and/or cut quality information is inferred from the appearance of the cut area A of the billet B. Also more specifically, in some implementations, the blade wear and/or cut quality information is inferred from the three-dimensional appearance.

The control system 100 may be configured to detect when the blade 30 is replaced (e.g., using the cut quality information, using a chopper pressure from the chopper pressure sensor 72, or other suitable method), and record blade replacement in the memory 106. In other implementations, the operator may input blade replacement into the control system 100. The message may be reset in response to blade replacement.

In operation, the stalks of crop are conveyed from the base cutter (not shown) to the chopper 28. The chopper 28 chops the crop and delivers a stream of billets B and extraneous plant matter to the cleaning chamber 32 by way of the blade 30. Extraneous plant matter and billets B are at least partially separated by the separator 55. The sensor 70 captures images of the billets B, and particularly of the cut areas A of the billets B and sends the image signals to the control system 100. The control system 100 analyzes the images, classifies the images by cut quality, and indexes indicators of the cut qualities into the memory 106. The control system 100 may communicate a message to the operator, or other interested party, by way of the human-machine interface 108, informative of blade wear and/or cut quality. The operator may change the blade 30 in response to the message. The message may be reset when the blade 30 is replaced.

Thus, the disclosure provides, among other things, a harvester having a cut quality detection and reporting system. Various features and advantages of the disclosure are set forth in the following claims.

What is claimed is:

1. A harvester comprising:
an inlet configured to receive a crop including a stalk;
a blade configured to cut the crop into a billet;
a sensor configured to detect a three-dimensional appearance of at least a portion of the billet and generate a signal associated with the three-dimensional appearance of the at least a portion of the billet; and
a control system including a processor, a memory, and a human-machine interface, wherein the control system is configured to
receive the signal from the sensor,
analyze the three-dimensional appearance of the at least a portion of the billet,
classify the three-dimensional appearance using an indicator of cut quality,
index the indicator of cut quality into the memory, and
communicate a message, by way of the human-machine interface, wherein the message indicates blade life and/or blade sharpness level inferred from the three-dimensional appearance of the at least a portion of the billet.

2. The harvester of claim 1, wherein the message is informative of cut quality based on the three-dimensional appearance of the at least a portion of the billet.

3. The harvester of claim 1, wherein the sensor includes at least one of a three-dimensional vision camera, a LIDAR device, or a structured light three-dimensional scanner.

4. The harvester of claim 1, wherein the sensor is configured to detect a three-dimensional image of a cut area of the billet, wherein the cut area is defined as an end portion of the billet that has been severed by the blade.

5. The harvester of claim 4, wherein a cut quality indicator is indexed in the memory based on a level of damage detected in the cut area of the billet.

6. The harvester of claim 1, wherein at least one of roundness of the cut area, appearance of severed fibers proximate the cut area, or a deviation from an optimal three-dimensional appearance of the cut area are parameters in analyzing the three-dimensional appearance.

7. The harvester of claim 1, wherein the control system is configured to employ a neural network to analyze and/or classify the three-dimensional appearance of the at least a portion of the billet, and
wherein a degree of crushing of the cut area and/or a number of cut surfaces proximate the cut area are parameters in analyzing the three-dimensional appearance.

8. The harvester of claim 1, wherein classifying the cut quality includes assigning a cut quality indicator from a range of cut quality indicators, wherein the range of cut quality indicators includes at least one indicator of relatively high cut quality and at least one indicator of relatively low cut quality.

9. A harvester comprising:
an inlet configured to receive a crop including a stalk;
a blade configured to cut the crop into a billet and thereby form a cut area of the billet;
a sensor configured to detect an appearance of the cut area of the billet in response to the billet passing through the harvester and to generate a signal corresponding to the appearance of the cut area of the billet; and
a control system including a processor, a memory, and a human-machine interface, wherein the control system is configured to receive the signal from the sensor, analyze the degree of roundness of the cut area of the billet, and communicate information, by way of the human-machine interface, indicative of blade wear inferred from the degree of roundness of the cut area of the billet.

10. The harvester of claim 9, wherein the message is further indicative of a cut quality inferred from the three-dimensional appearance of the at least a portion of the billet.

11. The harvester of claim 9, wherein the appearance of the cut area of the billet includes a three-dimensional appearance of the cut area of the billet.

12. The harvester of claim 9, wherein the sensor includes at least one of a three-dimensional vision camera, a LIDAR device, or a structured light three-dimensional scanner.

13. The harvester of claim 9, wherein the control system is further configured to index a cut quality indicator into the memory based on a level of damage detected in the cut area of the billet.

14. The harvester of claim 11, wherein at least one of degree of crushing, number of cut surfaces, appearance of severed fibers, or a deviation from an optimal appearance of each cut area are parameters in analyzing the appearance.

15. The harvester of claim 9, wherein the information indicates at least one of blade life inferred from the appearance of the cut area of the billet, a blade sharpness level inferred from the appearance of the cut area of the billet, or a blade damage level inferred from the appearance of the cut area of the billet.

16. A harvester comprising:
an inlet configured to receive a crop including a stalk;
a blade configured to cut the crop into a billet;
a sensor coupled to the harvester downstream of the blade, the sensor configured to detect a three-dimensional appearance of at least a portion of the billet and generate a signal corresponding to the three-dimensional appearance of the at least a portion of the billet; and
a control system including a processor, a memory, and a human-machine interface, wherein the control system is configured to
receive the signal from the sensor,
compare the detected three-dimensional appearance to an optimal three-dimensional appearance,
determine a degree of deviation between the detected three-dimensional appearance and the optimal three-dimensional appearance,
classify a cut quality of the billet based on the degree of deviation, wherein classifying the cut quality includes assigning a cut quality indicator from a range of cut quality indicators to the billet, wherein the range of cut quality indicators includes at least one indicator of relatively high cut quality and at least one indicator of relatively low cut quality,
index the cut quality indicator into the memory, and
communicate information, by way of the human-machine interface, indicative of blade life and/or blade sharpness level inferred from the degree of deviation between the detected three-dimensional appearance of the at least a portion of the billet and the optimal three-dimensional appearance.

17. The harvester of claim 16, wherein the cut quality indicator is assigned based on a level of visual damage to the billet caused by the blade.

18. The harvester of claim 16, wherein roundness and/or number of cut surfaces are parameters in classifying the cut quality.

19. The harvester of claim 16, wherein a degree of crushing and/or an appearance of severed fibers proximate the cut area are parameters in classifying the cut quality.

* * * * *